United States Patent [19]
Kohno et al.

[11] Patent Number: 5,232,714
[45] Date of Patent: Aug. 3, 1993

[54] IN-LINE SCREW TYPE INJECTION MOLDING MACHINE

[75] Inventors: Yasuyuki Kohno; Mitso Suzuki, both of Chiba, Japan

[73] Assignee: Sumitomo Heavy Industries, Ltd., Tokyo, Japan

[21] Appl. No.: 772,812

[22] Filed: Oct. 8, 1991

[30] Foreign Application Priority Data

Oct. 9, 1990 [JP] Japan .................... 2-269460

[51] Int. Cl.$^5$ .................................... B29C 45/76
[52] U.S. Cl. .................... 425/145; 264/40.4; 366/78
[58] Field of Search .............. 425/145, 149; 366/76, 366/78; 264/40.4

[56] References Cited

U.S. PATENT DOCUMENTS

| | | | |
|---|---|---|---|
| 3,721,512 | 3/1973 | Ma et al. | 425/149 |
| 3,797,808 | 3/1974 | Ma et al. | 366/78 |
| 3,822,057 | 7/1974 | Wheeler | 366/76 |
| 4,718,841 | 1/1988 | Kiya | 425/149 |

FOREIGN PATENT DOCUMENTS

| | | |
|---|---|---|
| 0169390 | 1/1986 | European Pat. Off. |
| 0193615 | 9/1986 | European Pat. Off. |
| 0217963 | 4/1987 | European Pat. Off. |
| 0228759 | 7/1987 | European Pat. Off. |
| 0245522 | 11/1987 | European Pat. Off. |
| 0249641 | 12/1987 | European Pat. Off. |
| 2148917 | 5/1972 | Fed. Rep. of Germany |
| 2093634 | 1/1972 | France |
| 2158182 | 6/1973 | France |
| 2249764 | 5/1975 | France |
| 2019608 | 10/1979 | United Kingdom |

OTHER PUBLICATIONS

Patent Abstracts of Japan, vol. 11, No. 6 (M-551) (2453), Jan. 8, 1987, & JP-A-61 182 913, Aug. 15, 1986.
Patent Abstracts of Japan, vol. 12, No. 376 (M-750) (3223), Oct. 7, 1988, & JP-A-63 126 716, May 30, 1988.
Patent Abstracts of Japan, vol. 10, No. 304 (M-526) (2360), Oct. 16, 1986, & JP-A-61 118 223, Jun. 5, 1986.
Patent Abstracts of Japan, vol. 12, No. 305 (M-733) (3152), Aug. 19, 1988, & JP-A-63 082 722, Apr. 13, 1988.

*Primary Examiner*—Tim Heitbrink
*Attorney, Agent, or Firm*—Nikaido, Marmelstein, Murray & Oram

[57] ABSTRACT

An in-line screw type injection molding machine having a screw in a heating cylinder. The screw is driven and rotated by a motor to charge a feedstock resin into the cylinder, the screw simultaneously undergoing retracting movement to allow the molten resin to be stored in the cylinder, and is driven and advanced to inject the molten resin. The machine includes an oscillator for outputting a movement signal in accordance with the retracting movement of the screw, a first calculator for calculating, from the movement signal, the position of the screw, and for outputting a position-detection signal, a position command signal generator for outputting a screw position command signal with the initial position at which the screw has started its retracting movement serving as the reference, a second calculator for calculating the difference between the position command signal and the position detection signal, and for outputting a difference signal, and a control section for controlling the driving of the motor on the basis of the difference signal. Preferably, the machine further includes a detector for detecting the number of revolutions per unit time of the screw, and for outputting a number of revolutions detection signal, so that the control section may correct the difference signal on the basis of the number of revolutions detection signal.

2 Claims, 2 Drawing Sheets

IN-LINE SCREW TYPE INJECTION MOLDING MACHINE

FIELD OF THE INVENTION

The present invention relates to an in-line screw type injection molding machine and, more particularly, to the controlling of the rotation of the screw during the metering process.

BACKGROUND OF THE INVENTION

In general, an in-line screw type injection molding machine has a heating cylinder and a screw disposed within the heating cylinder. During the metering process, the screw is rotated by driving it so that a feedstock resin is charged into the heating cylinder, and the feedstock resin is plasticated so that a molten resin is stored in the heating cylinder. Thereafter, the screw is driven and advanced to inject the molten resin into the mold cavity so that a molded object will be produced.

As described above, in the metering process, the screw is driven and rotated so that a molten resin will be stored in the cylinder. During this rotation, the screw is caused to gradually retract by the molten resin. Thus, the amount of the molten resin can be determined on the basis of the position to which the screw has retracted.

When a predetermined amount of a molten resin is to be stored in a heating cylinder, a conventional in-line screw type injection molding machine adopts a rotational speed control method, such as the following: A limit switch detects that the screw has reached a previously-set retracting position and, upon the detection, the rotation driving of the screw is stopped so that a previously-set amount of molten resin is stored in the heating cylinder.

If, as in the conventional machine, the driving of the screw is stopped when the screw has reached a previously-set retracting position, the following problem arises: Due to the inertia, etc. of the screw, the screw may move beyond the previously-set retracting position, thereby making it impossible to accurately meter the molten resin. As a result, the quality of the molded object may be degraded.

SUMMARY OF THE INVENTION

An object of the present invention is to provide an in-line screw type injection molding machine in which the screw can be stopped at a previously-set retracting position with a high level of precision.

An in-line screw type injection molding machine according to the present invention includes: a signal outputting device for outputting a movement signal in accordance with the retracting movement of the screw; a first calculation device for calculating, from the movement signal, the position of the screw, and for outputting a position detection signal; a position command signal outputting device for outputting a screw position command signal with the initial position at which the screw has started the retracting movement serving as the reference; a second calculation device for calculating the difference between the position command signal and the position detection signal, and for outputting a difference signal; and a control device for controlling the rotation driving of the screw on the basis of the difference signal.

Preferably, the in-line screw type injection molding machine further includes a detection device for detecting the number of revolutions per unit time of the screw, and for outputting a number of revolutions detection signal, the control device being adapted to correct the difference signal on the basis of the number of revolutions detection signal, and to control the rotation driving of the screw on the basis of the difference signal.

According to the present invention, a screw position command signal is output from the position command signal outputting device with the initial position at which the screw has started its retracting movement serving as the reference. On the other hand, a movement signal is output from the signal outputting device in accordance with the retracting movement of the screw. The first calculation device calculates, from the movement signal, the position of the screw, and outputs a position detection signal. The second calculation device calculates the difference between the position command signal and the position detection signal, and outputs a difference signal. The control device performs control over the rotation driving of the screw on the basis of the difference signal.

Thus, according to the present invention, since the rotation of the screw is controlled on the basis of the difference between the detected position of the screw and the command position, and thus the retracting position of the screw is controlled in effect, it is possible to stop the screw at a predetermined retracting position at a high level of precision.

The control device calculates, from the difference signal, a corresponding number of revolutions of the screw, and controls the rotation of the screw on the basis of the calculated number of revolutions. In this process, if the actual number of revolutions of the screw is detected and the difference signal is corrected on the basis of a signal indicating the detected number of revolutions, it is possible to further improve the level of precision with which the screw is stopped at the predetermined position.

DESCRIPTION OF THE PREFERRED EMBODIMENT

The present invention will now be described with respect to an embodiment thereof.

Figure 1:
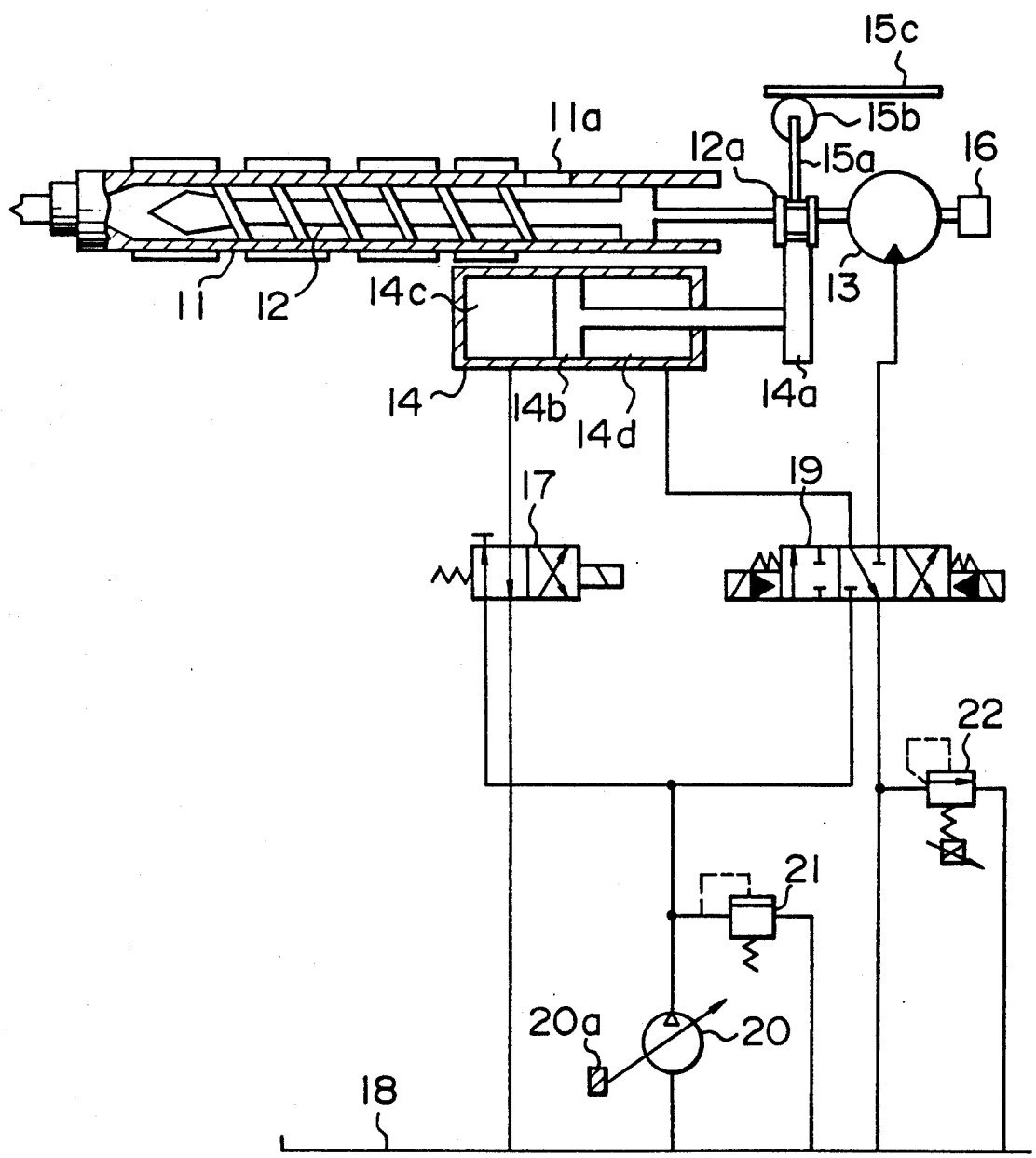
FIG. 1 is a schematic view of an embodiment of an in-line screw type injection molding machine to which the present invention is applied.

Referring to FIG. 1, a screw 12 is disposed in a heating cylinder 11 in such a manner as to be capable of advancing and retracting, and also rotating. A bearing member 12a is mounted on a rear end portion of the screw 12. A hydraulic motor 13 is mounted to the screw 12 with the bearing member 12a interposed therebetween. The driving of the hydraulic motor 13 causes the screw 12 to be driven and rotated.

A radially extending mounting member 14a has an end thereof attached to the outer peripheral surface of the bearing member 12a, the other end of the mounting member 14a being attached to a piston member 14b. The piston member 14b is disposed in a hydraulic cylinder 14. When hydraulic pressure is supplied into the hydraulic cylinder 14, the screw 12 is caused to advance or retract axially of the heating cylinder 11. When the screw 12 is rotated, however, force resulting from the rotation is not transmitted to the piston member 14b.

As shown in FIG. 1, a bar member 15a has an end thereof attached to the bearing member 12a, the other end carrying a pinion 15b mounted thereon. The pinion 15b is capable of moving on a rack 15c while rotating. A synchro oscillator (not shown in FIG. 1), etc. are connected to the rotary shaft of the pinion 15b so that, in accordance with the rotation of the pinion 15b, the synchro oscillator outputs a pulse signal.

On the other hand, a number of revolutions detector 16 is connected to the hydraulic motor 13 so that the detector 16 detects the number of revolutions per unit time of the hydraulic motor 13, that is, the corresponding number of the screw 12, and outputs a number of revolutions detection signal.

As shown in FIG. 1, the interior of the hydraulic cylinder 14 is divided by the piston member 14b into a first chamber 14c and a second chamber 14d. The first chamber 14c is connected with a tank 18 through a first solenoid operated directional control valve 17. The second chamber 14d is connected with the tank 18 through a second solenoid operated directional control valve 19. The first and second solenoid operated directional control valves 17 and 19 are connected with each other, and are connected with the tank 18 through a variable displacement pump 20 having a flow controller 20a.

As shown in FIG. 1, the output side of the variable displacement pump 20 is connected to the tank 18 through a relief valve 21. The second solenoid operated directional control valve 19 is connected with the hydraulic motor 13, and with the tank 18 through a proportional solenoid operated relief valve 22.

An injection molding cycle (including a metering process, an injection process, a hold pressure process) of the in-line screw type injection molding machine shown in FIG. 1 is controlled by, as is known, driving the variable displacement pump 20 to cause the flow rate of the hydraulic oil to be controlled by the flow controller 20a, and controlling and switching the first and second solenoid operated directional control valves 17 and 19, the relief valve 21, and the proportional solenoid operated relief valve 22.

Figure 2:
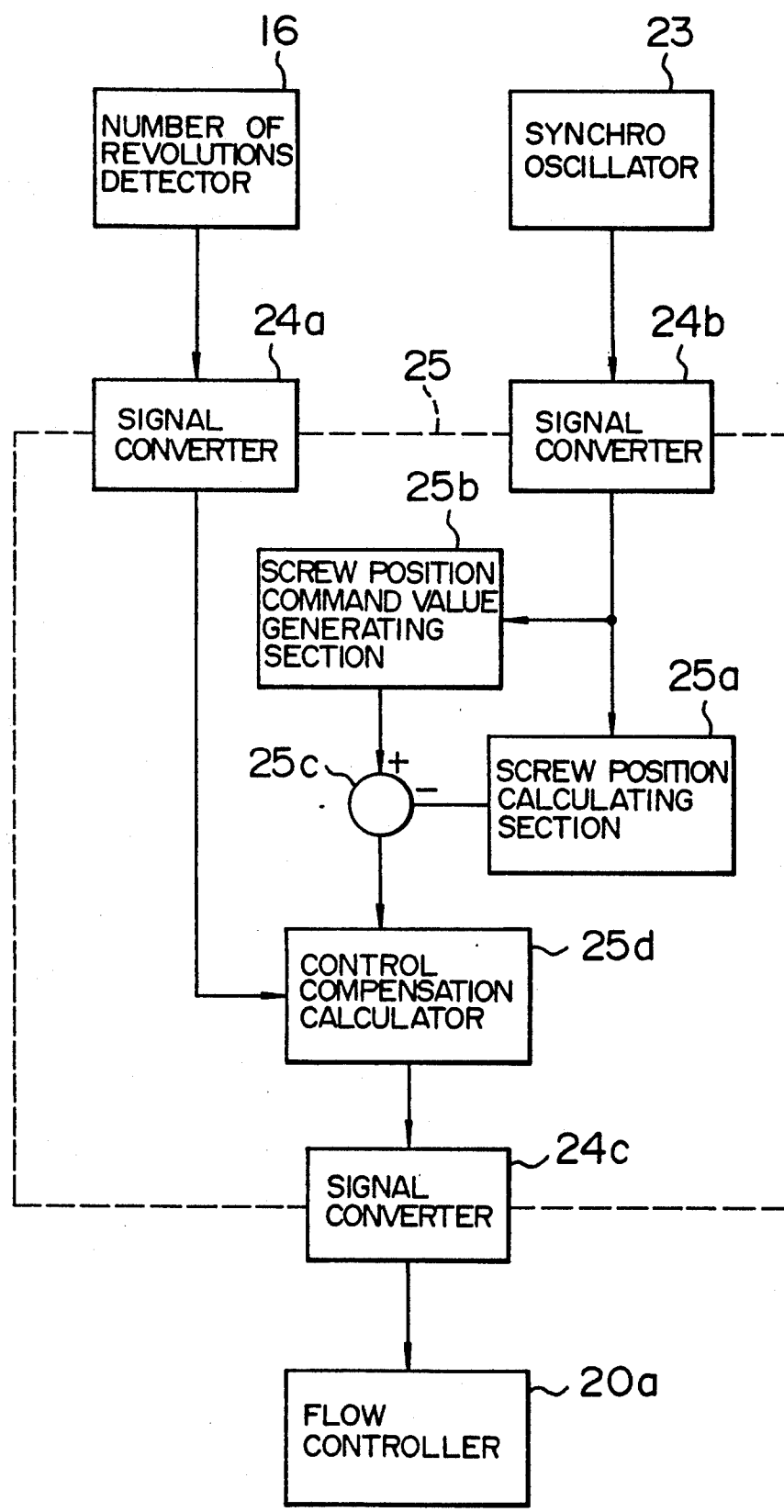
FIG. 2 is a block diagram of an embodiment of a control device used in the in-line screw type injection molding machine according to the present invention.

Referring to FIG.2, a control device to which the present invention is applied will be described.

The synchro oscillator 23 and the number of revolutions detector 16 are connected, through signal converters 24b and 24a, respectively, with a control device 25. The control device 25 has a screw position calculating section 25a, a screw position command value generating section 25b, a subtracter 25c and a control compensation calculator 25d, and the device 25 controls the flow controller 20a in the manner described later.

Referring to FIGS. 1 and 2, at the start of the metering, the solenoid (not shown) of the second solenoid operated directional control valve 19 is energized so that a hydraulic pressure is supplied from the variable displacement pump 20 to the hydraulic motor 13, thereby driving and rotating the hydraulic motor 13. This causes the screw 12 to be driven and rotated.

The rotation of the screw 12 causes a feedstock resin to be charged through a feedstock resin supply port 11a into the heating cylinder 11. The resin is plasticated, and stored as a molten resin at a forward portion of the inside of cylinder 11. As the molten resin accumulates, the screw 12 gradually retracts.

When the screw 12 starts retracting, the synchro oscillator 23 outputs a pulse signal. The first pulse of the pulse signal actuates the screw position command value generating section 25b.

A certain pattern in which the screw 12 is to be retracted is calculated at the start of the retracting movement of the screw (i.e., calculated simultaneously with the actuation of the screw position command value generating section 25b), and is prepared, in the generating section 25b, as a function of time ($X_{REF}=f(t)$; hereinafter referred to as "a position command signal"). The screw position command value generating section 25b continuously outputs the position command signal $X_{REF}$. On the other hand, the screw position calculating section 25a counts the number of pulses of the pulse signal and performs an integration, to thereby calculate the current position of the screw 12. The section 25a then outputs a position detection signal x(t).

The position command signal $X_{REF}$ and the position detection signal x(t) are fed to the subtracter 25c. The subtracter calculates the difference $\{X_{REF}-x(t)\}=W(t)$, and outputs the result as a difference signal. The difference signal W(t) is fed to the control compensation calculator 25d.

After the control compensation calculator 25d has performed a gain adjustment and the like, the calculator 25d calculates, on the basis of the difference signal W(t), the flow rate of the hydraulic oil that will have to be supplied to the hydraulic motor 13, and a signal indicating the flow rate is sent as a hydraulic oil amount adjustment signal to the flow controller 20a through the signal converter 24c.

The flow controller 20a adjusts the variable displacement pump 20 in such a manner that the hydraulic oil at the flow rate indicated by the hydraulic oil amount adjustment signal will be supplied to the hydraulic motor 13, thereby controlling the flow rate of the hydraulic oil sent to the hydraulic motor 13.

In this way, the position of the screw 12 is controlled on the basis of the difference signal W(t), that is, on the basis of the retracting pattern of the screw and the current position of the screw. It is therefore possible to control the retracting movement of the screw with a high level of precision in such a manner that the screw will be precisely stopped at a predetermined position. That is, if the screw retracting pattern is calculated with the inertia of the screw being taken into consideration, it is possible to meter the molten resin at a high level of precision.

When the control compensation calculator 25d controls the flow controller 20a, the flow controller 20a may be controlled by giving consideration to a number of revolutions detection signal from the number of revolutions detector 16. Specifically, the control compensation calculator 25d, which controls the rotation of the hydraulic motor 13 on the basis of the difference signal W(t), may have the following arrangement: During the above control, the control compensation calculator 25d is informed of the actual number of revolutions of the motor, and varies, on the basis of the detected number of revolutions, the gain, etc. by which the difference signal W(t) is multiplied, so as to send a corrected hydraulic oil amount adjustment signal with a view to effecting more flexible control of position.

If the rotation of the hydraulic motor 13 is controlled in this way on the basis of the corrected hydraulic oil amount adjustment signal, the molten resin can be metered at a higher level of precision.

When the metering process has been completed, the injection process and the hold pressure process are subsequently performed.

As described above, according to the present invention, since the rotation of the screw is controlled on the basis of the difference between the detected position of the screw and the previously-set pattern of the position of the screw, and thus the retracting position of the piston is controlled in effect, it is possible to stop the screw at a predetermined retracting position with a high level of precision. Accordingly, it is possible to meter the molten resin with a high level of precision, and hence, to improve the quality of the molded product.

What is claimed is:

1. An in-line screw injection molding machine having a heating cylinder allowing a molten resin to be stored therein, a rotatable screw disposed within said heating cylinder in such a manner as to be advancable and retractable, and a motor means for rotating said screw, wherein said screw is driven and rotated to charge a feedstock resin into said heating cylinder, said screw simultaneously undergoing retracting movement to allow said molten resin to be stored, and said screw is driven and advanced to inject said molten resin, said machine further comprising:

a signal outputting means for outputting a movement signal in accordance with the retracting movement of said screw;

a first calculation means for calculating, from said movement signal, the position of said screw, and for outputting a position detection signal;

a position command signal outputting means for outputting a screw position command signal with an initial position at which said screw has started said retracting movement serving as a reference;

a second calculation means for calculating a difference between said position command signal and said position detecting signal, and for outputting a difference signal; and a control means for controlling driving of said motor means during retracting movement based on said difference signal input from said second calculation means.

2. An in-line screw type injection molding machine according to claim 1, further comprising a detection device for detecting the number of revolutions per unit time of said screw, and for outputting a number of revolutions detection signal, said control device to correct said difference signal on the basis of said number of revolutions detection signal, and to control the driving of said motor device on the basis of the corrected difference signal.

* * * * *